United States Patent
Choe et al.

(10) Patent No.: US 8,520,558 B2
(45) Date of Patent: Aug. 27, 2013

(54) QUALITY OF SERVICE SECURING METHOD AND APPARATUS

(75) Inventors: Yun-ju Choe, Uiwang-si (KR); Cheol-ju Hwang, Yongin-si (KR); Soo-hong Park, Yongin-si (KR); Young-keun Kim, Incheon (KR); Han-sung Kim, Seongnam-si (KR); Won-dong Yun, Seoul (KR); Min-ho Lee, Gwacheon-si (KR); Jeong-rok Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 204 days.

(21) Appl. No.: 11/642,780

(22) Filed: Dec. 21, 2006

(65) Prior Publication Data
US 2007/0248028 A1    Oct. 25, 2007

(30) Foreign Application Priority Data

Apr. 19, 2006 (KR) .......... 10-2006-0035345
May 11, 2006 (KR) .......... 10-2006-0042393

(51) Int. Cl.
*H04L 12/56* (2006.01)
*H04J 1/16* (2006.01)

(52) U.S. Cl.
USPC ....... 370/278; 370/252; 370/331; 370/395.21

(58) Field of Classification Search
USPC ............... 370/395.21, 252, 278, 331
See application file for complete search history.

(56) References Cited

U.S. PATENT DOCUMENTS

| | | | |
|---|---|---|---|
| 7,346,007 | B2 | 3/2008 | Curcio et al. |
| 2003/0139185 | A1* | 7/2003 | Obata et al. ............... 455/436 |
| 2003/0186692 | A1* | 10/2003 | Tamura ................... 455/422.1 |
| 2004/0057420 | A1 | 3/2004 | Curcio et al. |
| 2004/0228276 | A1* | 11/2004 | Courtney ..................... 370/230 |
| 2004/0228304 | A1* | 11/2004 | Riedel et al. ................ 370/332 |
| 2005/0021804 | A1* | 1/2005 | Hameleers et al. .......... 709/231 |
| 2005/0041635 | A1 | 2/2005 | Chung et al. |

(Continued)

FOREIGN PATENT DOCUMENTS

| | | |
|---|---|---|
| CN | 1503532 | 6/2004 |
| CN | 1722694 A | 1/2006 |

(Continued)

OTHER PUBLICATIONS

Office Action issued in the Korean Patent Application No. 2006-42393 on Apr. 30, 2007.

(Continued)

*Primary Examiner* — John Pezzlo
(74) *Attorney, Agent, or Firm* — Staas & Halsey LLP

(57) ABSTRACT

A quality of service (QoS) securing apparatus and method using a communication protocol is provided. The QoS securing method is performed by a reception side that is receiving data from a transmission side. The method includes generating information about a changed communication environment according to a change in a communication environment of the reception side, and transmitting the information to the transmission side. An exchange of information about a communication environment using the communication protocol between the reception side and the transmission side can inform the transmission side about resources of the reception side, link characteristics, characteristics of a link on a transmission path, etc., thereby securing a QoS of data communication between the reception side and the transmission side.

30 Claims, 11 Drawing Sheets

(56) References Cited

U.S. PATENT DOCUMENTS

| | | | |
|---|---|---|---|
| 2005/0054319 A1* | 3/2005 | Tamaki et al. | 455/296 |
| 2005/0141548 A1* | 6/2005 | Koo et al. | 370/462 |
| 2005/0227694 A1* | 10/2005 | Hayashi | 455/436 |
| 2006/0014539 A1* | 1/2006 | Oh | 455/436 |
| 2006/0034213 A1* | 2/2006 | Munje et al. | 370/328 |
| 2006/0153153 A1* | 7/2006 | Bhagwat et al. | 370/338 |
| 2007/0156804 A1* | 7/2007 | Mo | 709/200 |

FOREIGN PATENT DOCUMENTS

| | | |
|---|---|---|
| EP | 1 628 446 | 2/2006 |
| EP | 1638261 A1 | 3/2006 |
| GB | 2 378 613 | 2/2003 |
| JP | 2005-57734 | 3/2005 |
| JP | 2005-73211 | 3/2005 |
| JP | 2006-500808 | 1/2006 |
| JP | 2006-33838 | 2/2006 |
| JP | 2006-50281 | 2/2006 |
| KR | 2001-16790 | 3/2001 |
| KR | 10-2005-0091218 | 9/2005 |
| WO | WO 2004/093479 | 10/2004 |
| WO | WO 2005/027558 | 3/2005 |
| WO | 2006/029663 A1 | 3/2006 |

OTHER PUBLICATIONS

Search Report issued in corresponding European Patent Application No. 07100371.9 on Sep. 18, 2007.

Itaya, N., et al., "Dynamic parameter adjustment for available-bandwidth estimation of TCP in wired-wireless networks", Computer Communications, Jun. 20, 2004, vol. 27, No. 10, pp. 976-988.

Japanese Office Action dated Jan. 17, 2012 issued in corresponding Japanese Patent Application No. 2007-099823.

Chinese Office Action dated Dec. 16, 2011 issued in corresponding Chinese Patent Application No. 200710006131.0.

Norihiro Fukumoto et al., "A quality control Mechanism for Multimedia streams based on the Multi-RTCP Scheme for QoS Reporting over Wireless IP-based Networks", IEICE Technical Report, vol. 104, No. 689, Feb. 2005, pp. 125-132.

Japanese Office Action mailed Sep. 13, 2011 issued in corresponding Japanese Patent Application No. 2007-099823.

Nagatsugu Yamanouchi et al. "Buffer Control for multimedia stream transfer over WCDMA packet mode with ARG", Research Report of Information Processing Academy, vol. 2001 Issue 59, Jun. 2001, pp. 37-42.

Hiroaki Hagino et al. "File Change Method for Mobile Streaming QoS Server", Research Report of Information Processing Academy, vol. 2002 Issue 24, Mar. 2002, pp. 91-97.

First Chinese Office Action issued Jul. 2, 2012 in corresponding Chinese Patent Application No. 200910253252.4.

Third Chinese Office Action issued Jul. 25, 2012 in corresponding Chinese Patent Application No. 200710006131.0.

Japanese Office Action issued Jun. 26, 2012 in corresponding Japanese Patent Application No. 2007-099823.

Chinese Office Action issued Oct. 29, 2012 in corresponding Chinese Patent Application No. 200710006131.0.

* cited by examiner

QUALITY OF SERVICE SECURING METHOD AND APPARATUS

CROSS-REFERENCE TO RELATED APPLICATIONS

This application claims the benefit of Korean Patent Application Nos. 2006-35345 and 2006-42393, filed on Apr. 19 and May 11, 2006, respectively, in the Korean Intellectual Property Office, the disclosures of which are incorporated herein by reference.

BACKGROUND OF THE INVENTION

1. Field of the Invention

Aspects of the present invention relate to a quality of service (QoS) securing apparatus and method using a communication protocol and, more particularly, to a method and apparatus for securing QoS of data communication by exchanging information using a communication protocol between a reception side and a transmission side.

2. Description of the Related Art

Owing to the development of wired/wireless communication technology, wired/wireless communication services supporting multimedia come in a variety of types and standards. In particular, with increased data transmission speeds, more services provide music or movies in real-time streaming through wired/wireless communication. In this regard, it is very important to allow service users to listen to music or to see movies seamlessly. A method of securing quality of service (QoS) for ensuring seamless data communication between a reception side and a transmission side is critical to a communication environment as described below.

FIG. 1 is a diagram of a conventional data communication session showing a handover between heterogeneous networks. Referring to FIG. 1, a mobile terminal of a reception side 110 moves from a wireless LAN network 130 having a maximum data transmission speed of 2 Mbps to a Wideband Code Division Multiple Access (WCDMA) network 140 having a maximum data transmission speed of 384 Kbps. A transmission side 120 transmits data at a speed of 1 Mbps (101) in the wireless LAN network 130 having a maximum data transmission speed of 2 Mbps before the mobile terminal of the reception side 110 performs the handover (102). Even after the handover (102) is performed, since the transmission side 120 is not informed of link characteristics of the WCDMA network 140 to which the mobile terminal of the reception side 110 moved, the transmission side 120 continues to transmit data (103) at the same speed of 1 Mbps. As a result, the mobile terminal of the reception side 110 cannot entirely receive the data transmitted from the transmission side 120, resulting in data loss. Therefore, if the transmission side 120 transmits streaming data of music or movie, the reception side 110 cannot seamlessly listen to music or see movies in real time.

FIG. 2 is a diagram of another conventional data communication session according to a handover between heterogeneous networks. Referring to FIG. 2, contrary to the data communication session illustrated in FIG. 1, a mobile terminal of a reception side 210 moves from a WCDMA network 230 having a maximum data transmission speed of 384 Kbps to a wireless LAN network 240 having a maximum data transmission speed of 2 Mbps. A transmission side 220 transmits data at a speed of 384 Kbps (201) before the mobile terminal of the reception side 210 performs the handover (202). Even after the handover (202) is performed, since the transmission side 220 is not informed of the link characteristics of the wireless LAN network 240 to which the mobile terminal of the reception side 210 moved, the transmission side 220 continues to transmit data (203) at the same speed of 384 Kbps. As a result, the transmission side 220 transmits the data at the inefficient speed of 156 Kbps in the wireless LAN network 240, which has a maximum data transmission speed of 2 Mbps.

Like the handover between heterogeneous networks, illustrated in FIGS. 1 and 2, network link characteristics after a handover between homogeneous networks is performed can be different from those before the handover is performed. If a network has more users after the handover is performed than that before the handover is performed, users communicate with each other at a slow speed in the network. Also, if the network has a higher bit error rate after the handover is performed than before the handover is performed, data is transmitted at a lower speed in order to reduce the bit error rate. If the network has fewer users and a lower bit error rate after the handover is performed than that before the handover is performed, data is transmitted at a higher speed.

When a reception side communicates in a network without a handover between networks, data transmission speed may vary due to changes in the number of users in the network and a data communication environment.

Information about a change in usable resources necessary for processing data being received by a terminal of a reception side can influence the QoS of data communication. Although the terminal of the reception side cannot process the data currently being received due to a change of hardware characteristics of a CPU, memory, etc., which are used to process the data, if a transmission side transmits data, the terminal of the reception side cannot properly receive the data. If the transmission side transmits encoded music or movie that cannot be processed by the reception side, the terminal of the reception side cannot properly receive the music or movie.

The transmission side transmits data according to a changed communication environment, so that the QoS of data transmission can be secured. For example, data of a lower quality music or movie can be transmitted in a network having a lower transmission speed than in another network, in order to provide a real time service. Also, data of a higher quality music or movie can be transmitted in a network having a faster transmission speed than in another network, in order to provide a good quality streaming service. If more of the CPU or memory is allocated to the reception side in order to process data transmitted from the transmission side, the transmission side can transmit data of a higher quality music or picture than before the CPU or memory is allocated.

Conventional sliding window congestion control using the TCP protocol is used to change the size of data according to the communication environment of the reception side. The reception side transmits an acknowledgment (ACK) signal indicating that the reception side has received data from the transmission side without an error. The transmission side receives the ACK signal normally and increases the amount of data transmitted at a time. However, if the transmission side does not receive the ACK signal, the transmission side reduces the amount of data transmitted at a time. Since data transmission speed can be controlled according to improvement or deterioration of the link characteristics of the reception side, the transmission side can transmit data based on the link characteristics of the reception side. However, conventional sliding window congestion control requires considerable time to transmit data based on the improved or deteriorated link characteristics of the reception side, which causes links to be ineffectively used during the delayed time.

SUMMARY OF THE INVENTION

Aspects of the present invention provide a method and apparatus for securing quality of service (QoS) of data communication between a reception side and a transmission side, although characteristics of links of the reception side or usable resources used to process data are changed.

Aspects of the present invention also provide a computer readable recording medium storing a program for executing the method.

According to an aspect of the present invention, there is provided a quality of service (QoS) securing method comprising: generating information about a changed communication environment according to a change in a communication environment of a reception side that is receiving data from a transmission side; and transmitting the information to the transmission side.

According to another aspect of the present invention, the information about the changed communication environment comprises information about characteristics of a link of the changed communication environment and/or information about useable resources for processing data being received by the reception side in the changed communication environment.

According to another aspect of the present invention, the information about the link characteristics is information about characteristics of a link of a second network when the reception side performs a handover from a first network to the second network.

According to another aspect of the present invention, transmitting of the information comprises transmitting the information about the characteristics of the link of the second network before the handover is performed.

According to another aspect of the present invention, the method further comprises performing a handover when the reception side receives response information about the link characteristics from the transmission side.

According to another aspect of the present invention, transmitting the information comprises transmitting the information about the characteristics of the link of the second network after the handover is performed.

According to another aspect of the present invention, the information about the useable resources is about at least one of a CPU, a useable codec, a display resolution, a memory, and the size of a receiving buffer of a device of the reception side.

According to another aspect of the present invention, there is provided a QoS securing apparatus comprising: a communication environment information generator generating information about a changed communication environment according to a change in a communication environment of a reception side that is receiving data from a transmission side; and a transmitter transmitting the information about the changed communication environment to the transmission side.

According to another aspect of the present invention, the information about the changed communication environment comprises information about characteristics of a link of the changed communication environment and/or information about useable resources for processing data being received by the reception side in the changed communication environment.

According to another aspect of the present invention, there is provided a QoS securing method comprising transmitting data from a transmission side to a reception side; receiving information about a communication environment of the reception side from the reception side; and changing a QoS for transmission of the data based upon the received information.

According to another aspect of the present invention, the information about the communication environment comprises information about characteristics of a link of the communication environment of the reception side and/or information about useable resources for processing data being received by the reception side in the communication environment of the reception side.

According to another aspect of the present invention, the method further comprises generating response information indicating that the QoS for the transmission of the data has been changed based upon the information about the communication environment; and transmitting the response information to the reception side.

According to another aspect of the present invention, there is provided a QoS securing apparatus comprising: a transmission side transmitting data to a reception side; a communication environment information receiver receiving information about a communication environment of the reception side; and a QoS controller changing a QoS based upon the information about the communication environment.

According to another aspect of the present invention, the apparatus further comprises a response information generator generating response information indicating that the QoS for the transmission of the data has been changed according to the information about the communication environment; and a transmitter transmitting the response information to the reception side.

According to another aspect of the present invention, there is provided a computer readable recording medium storing a computer readable program for executing a QoS securing method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
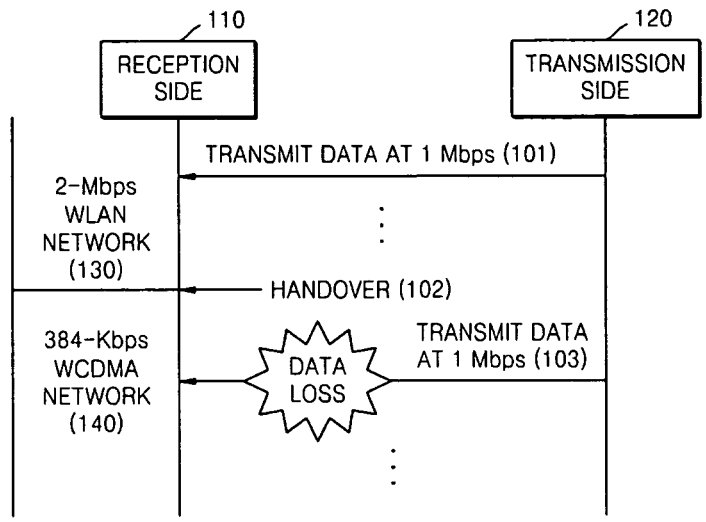
FIG. 1 is a diagram of a conventional data communication session according to a handover between heterogeneous networks.
Figure 2:
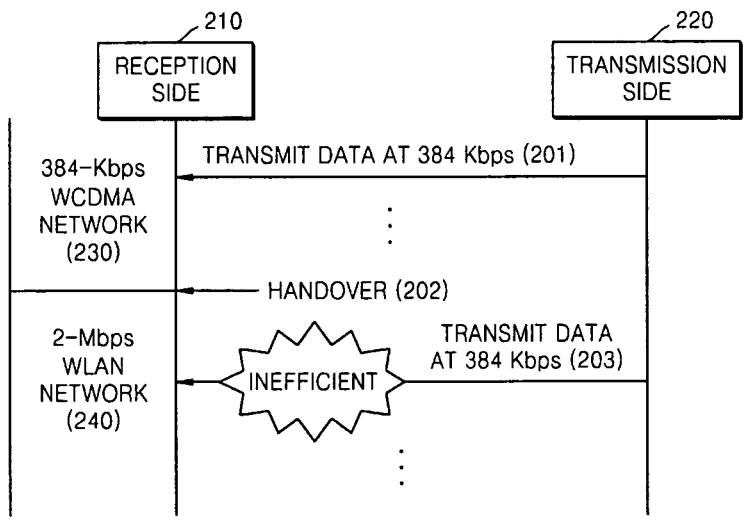
FIG. 2 is a diagram of another conventional data communication session according to a handover between heterogeneous networks.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
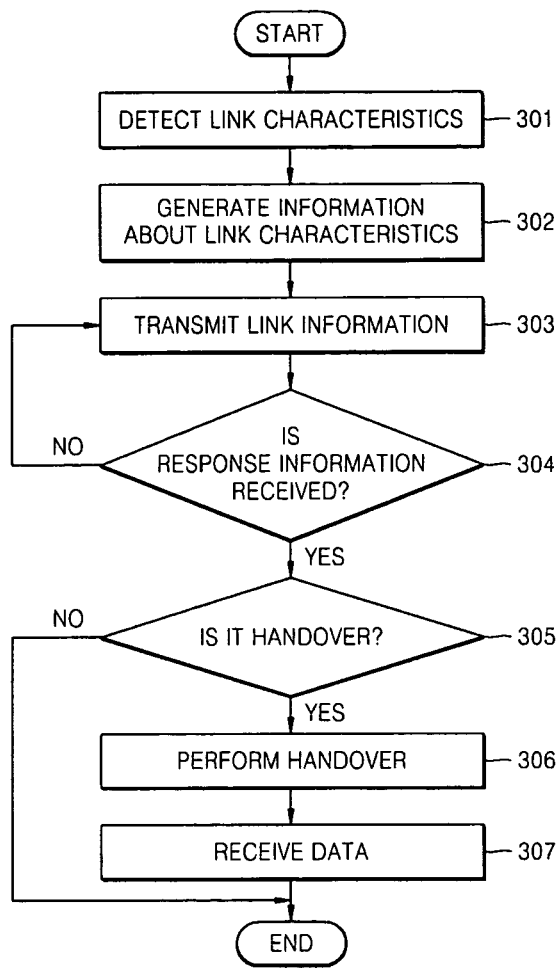
FIG. 3 is a flowchart of a method of securing a quality of service (QoS) according to link characteristics of a reception side, according to an embodiment of the present invention.

FIG. 3 is a flowchart of a method of securing a quality of service (QoS) according to link characteristics of a reception side, according to a first embodiment of the present invention. Referring to FIG. 3, the reception side detects link characteristics of a network (Operation 301). The reception side can detect the link characteristics by analyzing a predetermined signal transmitted from an access point (AP) or a router of the network to which the reception side belongs. The AP is included in a wireless LAN and indicates a base station in mobile communication such as Code Division Multiple Access (CDMA), Wideband Code Division Multiple Access (WCDMA), etc. The wireless network may support any standard, such as GSM (Global System for Mobile Communications). The network may also be a wired network. A detection method such as the network driver interface specification (NDIS) of the Windows operating system (OS) detects characteristics of a link between wired stations or wireless stations that are adjacent to the reception side and transmit data to the reception side.

The detected link characteristics include information about the strength of a data transmission signal, data transmission speed, bit error rate (BER), etc. The detected link characteristics can include information about wireless communication standards of a wireless communication network, information about a wired network, or any information about any network. A terminal of the reception side that receives data in the wireless LAN may analyze a beacon signal that is regularly transmitted from other terminals in the network or from the AP in order to detect the link characteristics of the network. Other aspects of the present invention may use information from another source.

In a handover from a first homogeneous/heterogeneous network to a second homogeneous/heterogeneous network, the reception side detects information about link characteristics of the second homogeneous/heterogeneous network.

The method of securing the QoS can further determine link status according to the link characteristics (not shown). The detected link status can include information about various factors as mentioned above. Therefore, it transmitting the information based on various factors to a transmission side is inefficient. To overcome this defect, a communication environment of the network to which the reception side belongs is divided into a plurality of levels according to how good the communication environment is, coefficients are allocated according to each of the levels, and the allocated coefficients are transmitted, so that the transmission side can determine link characteristics of the reception side from the received coefficients.

The reception side generates information about the detected link characteristics (hereinafter referred to as "link information") (Operation 302). The reception side generates the link information regularly or when the link characteristics are changed, in order to transmit the link information to the transmission side (Operation 303). According to other aspects, the reception side may generate the link information at any time.

The reception side determines whether the transmission side has transmitted information in response to the link information transmitted from the reception side (Operation 304). If the transmission side has not transmitted a packet including the response information to the reception side, the reception side returns to operation 303 to transmit the changed link information again. If the transmission side has transmitted a packet including the response information to the reception side, the reception side determines whether a handover is performed (Operation 305).

The reception side that receives the response information from the transmission side performs the handover, if a handover is needed (Operation 306). If the link characteristics are changed due to the handover in operation 305, since the reception side already received the response information from the transmission side, the reception side performs the handover in operation 306 and receives the data (Operation 307). However, if the link characteristics are changed due to the changed link information in the same network, and no handover has occurred, the reception side receives the data according to the changed link characteristics in operation 307.

As described above, the link characteristics can be changed due to differences in the number of network users, the strength of the signal, the BER, etc. between before and after the handover is performed between homogeneous networks. Therefore, the handover is performed between homogeneous/heterogeneous networks in operation 305.

Figure 4A:
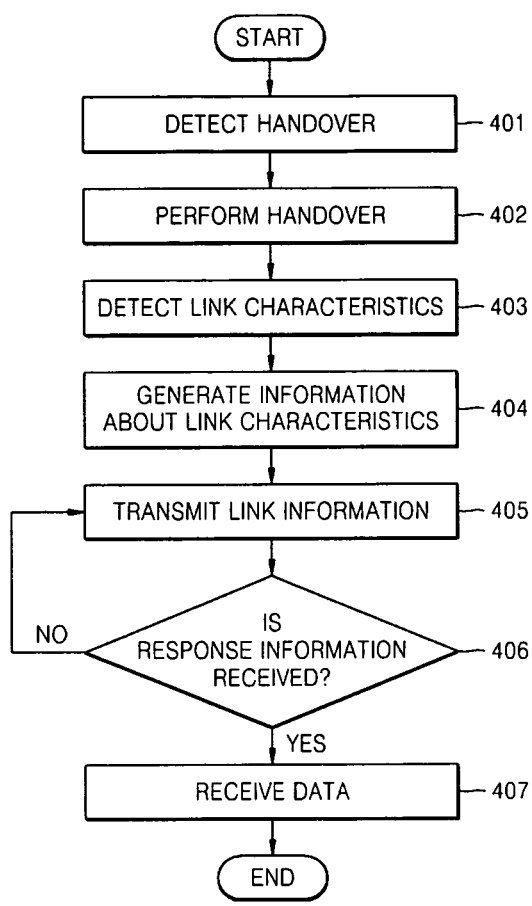
FIG. 4A is a flowchart of a method of transmitting information about link characteristics after a handover is performed, which is one of the operations of a QoS securing method performed by a reception side, according to an embodiment of the present invention.

FIG. 4A is a flowchart of a method of transmitting information about link characteristics after a handover is performed, which is one of the operations of a QoS securing method performed by a reception side, according to a second embodiment of the present invention. Referring to FIG. 4A, the reception side detects a handover from a first network to a second network (Operation 401) and performs the handover (Operation 402).

The reception side detects link characteristics of the second network (Operation 403). As described with reference to FIG. 3, the detected link characteristics include information about the strength of a data transmission signal, data transmission speed, BER in the second network, and information about wireless communication standards of a wireless communication network. Other aspects of the invention may include any information.

The reception side generates information about the detected link characteristics using a communication protocol (Operation 404). Like operation 302 illustrated in FIG. 3, the reception side generates the information regularly in order to transmit the link information (Operation 405) or generates a packet when the link characteristics are changed. Other aspects of the present invention may generate link information at any time.

The reception side determines whether a transmission side has transmitted information in response to the link information transmitted from the reception side (Operation 406). If the transmission side has not transmitted the response information, the reception side transmits the link information to the transmission side in operation 405. If the transmission side has transmitted the response information, the reception side receives the data (Operation 407).

The reception side does not separately perform the QoS securing method illustrated in FIGS. 3 and 4A but can repeatedly transmit the link information after a handover is performed even when the reception side transmits the link information before the handover is performed. In addition, the reception side can transmit the link information after the handover is performed only when the reception side fails to transmit the link information due to an avoidable reason before the handover is performed.

Figure 4B:
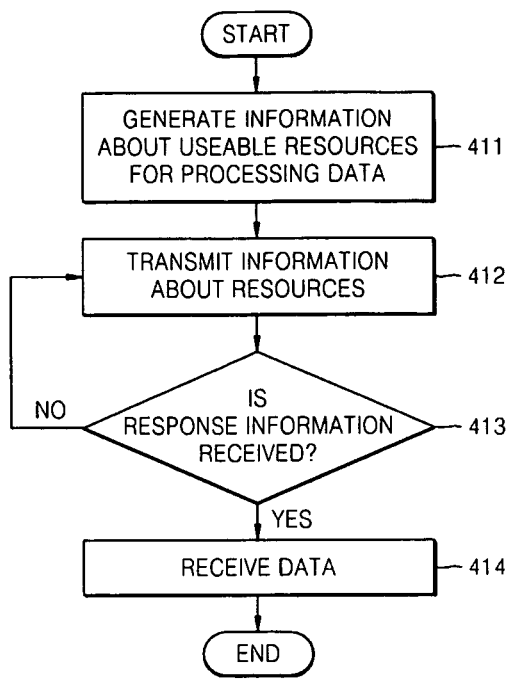
FIG. 4B is a flowchart of a QoS securing method performed by a reception side according to a change in resource characteristics which are necessary to process data according to an embodiment of the present invention.

FIG. 4B is a flowchart of a QoS securing method performed by a reception side according to a change in resource characteristics which are necessary to process data according to a third embodiment of the present invention. Communication environment information includes information about useable resources for processing data being received by the reception side in addition to the information about the link characteristics illustrated in FIGS. 3 and 4A, which is transmitted to a transmission side so as to perform the method of securing a QoS of data communication. Communication environment information may include any information useful in determining a QoS.

Referring to FIG. 4B, the reception side generates information about useable resources for processing currently received data (Operation 411). The information about the useable resources includes information about hardware characteristics such as a CPU, memory, the size of a receiving buffer, display resolution, etc., which are necessary to process data being received by a terminal of the reception side, and information about software characteristics such as a useable video/audio codec, etc., used in the terminal of the reception side. The reception side transmits to the transmission side information about the hardware/software characteristics and information about the useable resources, including characteristics of the terminal that can influence a data communication environment of the reception side and the transmission side. Other aspects of the present invention may transmit any information about usable resources.

The reception side transmits the information about the useable resources to the transmission side (Operation 412). The reception side transmits the information about the useable resources to the transmission side if the information is changed. The reception side may also regularly transmit the information about the resources to the transmission side. Other aspects of the present invention may transmit the information at any time.

The reception side determines whether the transmission side has transmitted information in response to the information about the resources transmitted from the reception side (Operation 413). If the reception side receives the response information from the transmission side, the reception side receives data according to a changed QoS (Operation 414). If the reception side does not receive the response information from the transmission side, the reception side returns to operation 412 and transmits the information about the useable resources again.

Figure 5:
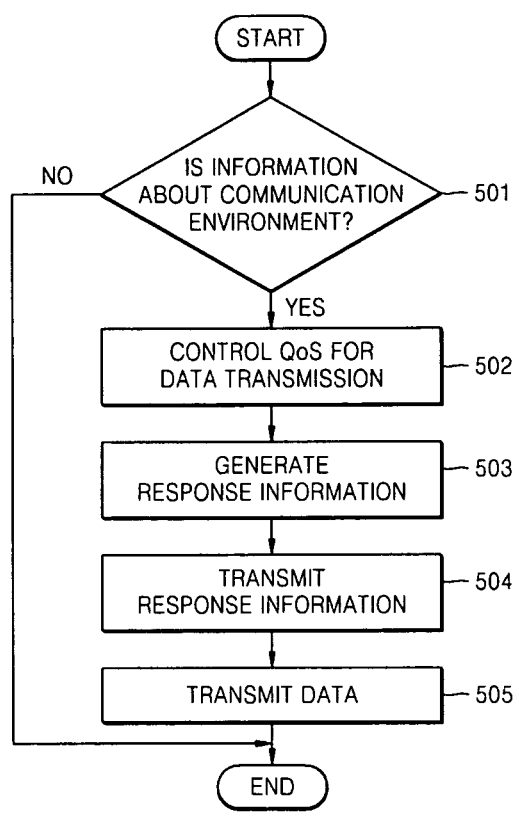
FIG. 5 is a flowchart of a QoS securing method performed by a transmission side according to an embodiment of the present invention.

FIG. 5 is a flowchart of a QoS securing method performed by a transmission side according to a fourth embodiment of the present invention. Referring to FIG. 5, the transmission side determines whether to receive information about a communication environment transmitted from a reception side (Operation 501). If the transmission side receives the information, the transmission side changes the QoS of data transmission (Operation 502). If the transmission side does not receive the information, since there is no change in link characteristics or status of resources used by the reception side, the transmission side keeps transmitting data to the reception side (Operation 504).

The transmission side changes the QoS of data transmission according to the information about the communication environment transmitted from the reception side in operation 502. If a BER of the reception side is increased due to deterioration of the link characteristics, a forward error correction (FEC) method is used to reduce the BER. If a data transmission speed is reduced according to a data transmission speed of the reception side, a method of encoding data to be transmitted is used to reduce the number of frames per second of movie data to reduce the resolution. The method can be changed to another method having high compressibility. If the data transmission speed is increased, then the QoS is changed by increasing the number of frames per second, increasing the resolution, or using a data encoding method having low compressibility. The transmission side can have various kinds of quality of content, and transmit high or low quality content according to deterioration or improvement of the link characteristics of the reception side. There is no limitation to the QoS control method. All methods of changing quality of data being transmitted based on a change in the communication environment of the reception side can be used to control the QoS.

The transmission side generates response information indicating that the transmission side is ready to transmit data according to the changed information about the communication environment (Operation 504). The transmission side can generate the response information by designating a specific bit of a data packet transmitted to the reception side as "0" or "1" to indicate whether the transmission side is ready to transmit the data. Other aspects of the present invention may use other ways to generate the response information. In addition, the transmission side can generate the response information specifically indicating how the data is encoded, the data format, the size of the data, etc. How the data is encoded includes the number of frames per second, a resolution, compressibility, an FEC, or other information about the encoding technique.

The transmission side transmits a packet including the response information (Operation 504), and transmits the data according to changed link information of the reception side (Operation 505).

Figure 6A:
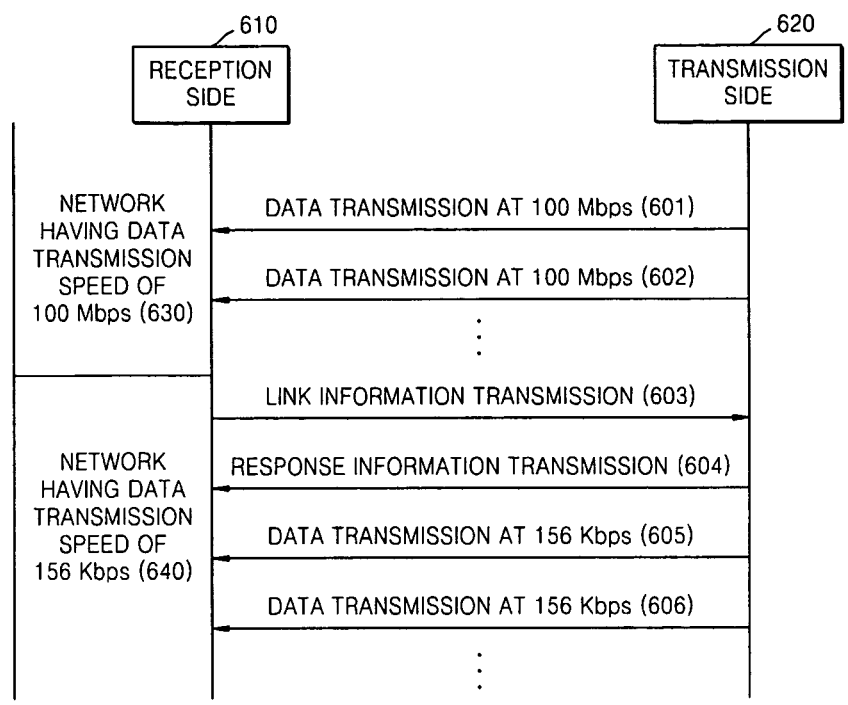
FIG. 6A is a diagram of a data communication session of a QoS securing method according to an embodiment of the present invention.

FIG. 6A is a diagram of a session of communicating link information when a handover between homogeneous/heterogeneous networks is performed according to any embodiment of the present invention.

Referring to FIG. 6A, it is shown that a transmission side 620 transmits data at a transmission speed of 100 Mbps in a network 630 having a data transmission speed of 100 Mbps to a reception side 610 (Operations 601 and 602). Other aspects of the present invention may use any speed. Since the reception side 610 is moving to a network 640 having a data transmission speed of, for example, 156 Kbps, the reception side 610 detects link characteristics of a changed network. The reception side 610 generates link information according to the detected link characteristics and transmits the link information to the transmission side 620 (Operation 603). The transmission side 620 that receives a packet transmits response information to the reception side 610 (Operation 604). The reception side 610, upon receiving the response information, performs a handover. After operations 603 and 604 are performed, the transmission side 620 transmits data at a transmission speed of 156 Kbps according to the changed link characteristics (Operations 605 and 606).

When the reception side 610 moves from the network 630 to the network 640, the data transmission speed is changed due to the handover performed between homogeneous/heterogeneous networks.

Figure 6B:
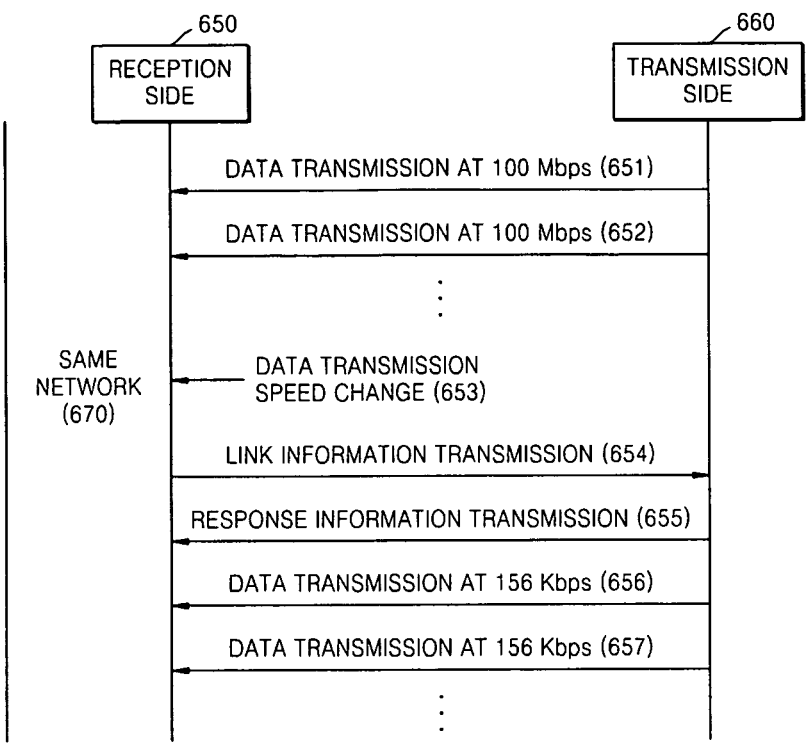
FIG. 6B is a diagram of a data communication session of a QoS securing method according to another embodiment of the present invention.

Referring to FIG. 6B, the data transmission speed is changed when a reception side 650 and a transmission side 660 communicate data in the same network, i.e., using the same base station or AP, without a handover between homogeneous/heterogeneous networks.

The transmission side 660 transmits data at a transmission speed of, for example, 100 Mbps to the reception side 650 (Operations 651 and 652). The data transmission speed then changes (Operation 653). The data transmission speed may change due to a change in a user who logs on the same base station or AP, a change in signal strength, or for any reason.

The reception side 650 transmits information about characteristics of a changed link to the transmission side 660 (Operation 654). The transmission side 660 transmits response information to the reception side 650 (Operation 655). After operations 654 and 655 are performed, the transmission side 660 transmits the data at a transmission speed of, for example, 156 Kbps according to the changed link information (Operations 656 and 657).

The data transmission speed is changed with reference to FIGS. 6A and 6B. However, when a BER is increased or reduced due to an interruption of a radio wave or a communication environment is deteriorated or improved due to a change in signal strength, all changes in factors causing the change in the link characteristics during data transmission between a reception side and a transmission side can be included in the link information. That is, any information relating to a change in link characteristics may be included.

When link information of a reception side is transmitted to a transmission side, and the transmission side transmits data according to the link information, the link information includes only information about a link between an AP or a router that directly accesses a terminal of the reception side. However, data communication between the reception side and the transmission side can be influenced by link characteristics of a transmission path such as the router or a repeater on a transmission path between the reception side and the transmission side. Therefore, a method of transmitting data performed by a transmission side based on link information of the transmission path is useful.

Figure 7:
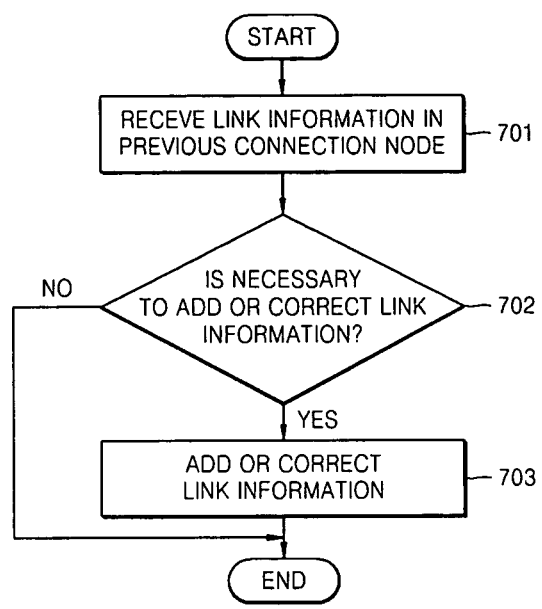
FIG. 7 is a flowchart of a QoS securing method based on link information of a transmission path according to an embodiment of the present invention.

FIG. 7 is a flowchart of a QoS securing method based on link information of a transmission path according to a fifth embodiment of the present invention. Referring to FIG. 7, a connection node that is used for repeating data receives link information that a reception side transmits to a transmission side (Operation 701). The link information includes only link characteristics of the connection node adjacent to the reception side.

The connection node that is used for repeating the data determines whether to add or correct the link information (Operation 702). If the connection node cannot transmit the data according to the link information of the reception side, then the connection node adds or corrects the link information (Operation 703) in order to generate link information based on the link characteristics of the transmission path.

Figure 8:
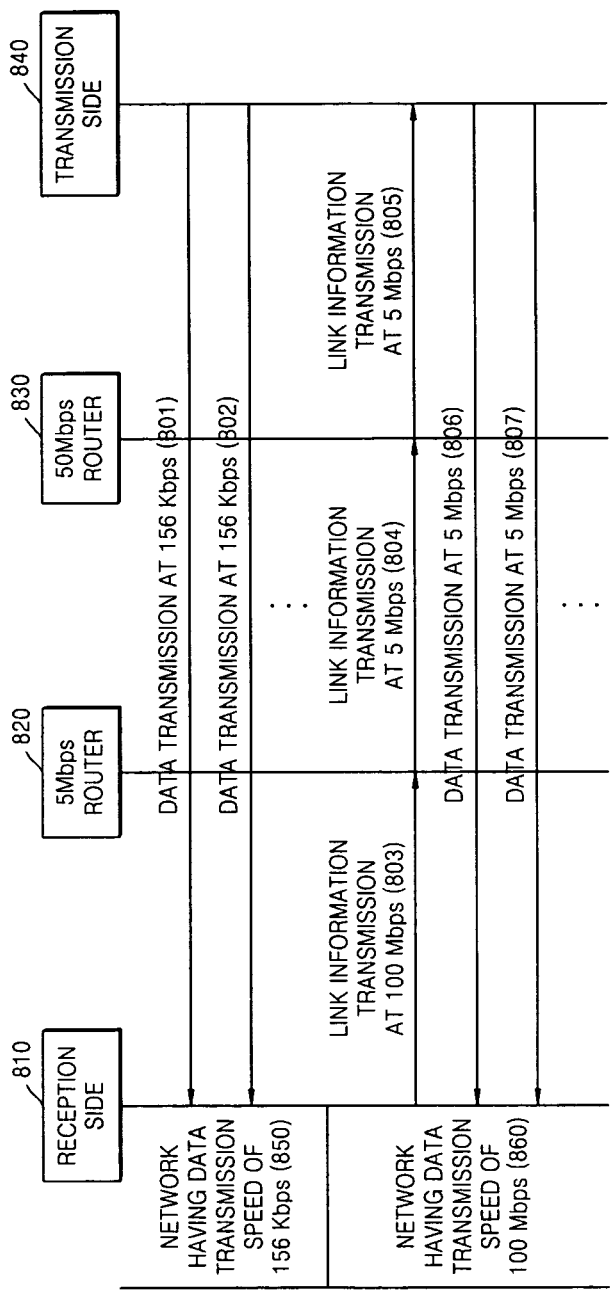
FIG. 8 is a diagram of a link information communication session including link information of a transmission path according to an embodiment of the present invention.

FIG. 8 is a diagram of a link information communication session including link information of a transmission path according to the fifth embodiment of the present invention. Referring to FIG. 8, a reception side 810 forms a link with a transmission side 840 through a router 820 having a data transmission speed of 5 Mbps and a router 830 having a data transmission speed of 50 Mbps, and the transmission side 840 transmits data at a transmission speed of 156 Kbps to the reception side 810 in a network 850 having a data transmission speed of 156 Kbps (Operations 801 and 802, respectively). Since the data transmission speed increases from 156 Kbps to 100 Mbps as the reception side 810 moves from the network 850 to the network 860, the reception side 810 generates link information of the data transmission speed of 100 Mbps and transmits the link information to the router 820 (Operation 803). However, since the router 820 has a transmission speed of 5 Mbps, although the transmission side 840 transmits data at the transmission speed of 100 Mbps, the reception side 810 cannot receive the data. Therefore, the router 820 changes the link information in accordance with the data transmission speed of 5 Mbps and transmits the link information to the router 830 (Operation 804).

The router 830 that receives the link information from the router 820 does not change the link information and transmits it to the transmission side 840 (Operation 805), since the link information has the data transmission speed of 5 Mbps, which is lower than the router 830's data transmission speed of 50 Mbps.

Accordingly, the transmission side 803 transmits data at the transmission speed of 5 Mbps (Operations 806 and 807) according to the link information (805) reflecting link characteristics of the transmission path, thereby securing a QoS of data transmission between the reception side 810 and the transmission side 840.

The routers 820 and 830 on the transmission path do not change the link information transmitted from the reception side 810, but rather add link information based on the data transmission speed supported by the routers 820 and 830 in order to transmit the added link information. The transmission side 840 can compare the link information transmitted from the reception side 810 and the added link information and thereby transmit data at an optimum data transmission speed.

The link characteristics are changed due to changes in factors affecting data transmission status between the reception side 810 and the transmission side 840 such as an increase or reduction of the data transmission speed, an increase or reduction of a BER caused by the interruption of a radio wave, deterioration or improvement of a communication environment caused by the reduction of signal strength, etc. Other aspects of the present invention may change link characteristics due to a change in any factor.

There is no limitation to a method of generating and transmitting communication environment information and transmitting. However, since the data transmission between the reception side and the transmission side is made based on a packet structure, the link information can be included in a data packet and transmitted using a communication protocol.

Figure 9:
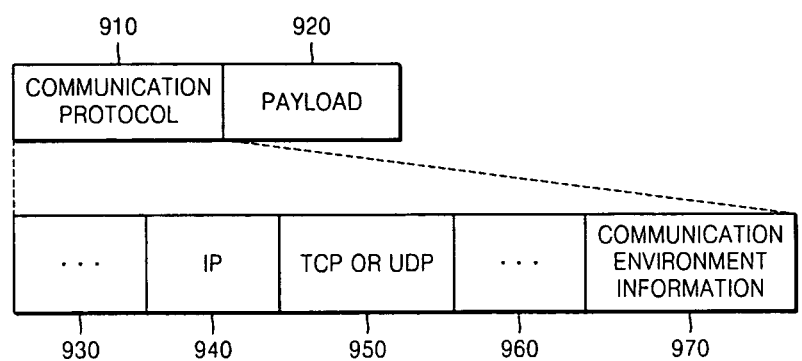
FIG. 9 illustrates a packet structure including communication environment information according to an embodiment of the present invention.

Referring to FIG. 9, a packet used to communicate data is divided into a communication protocol field 910 indicating a data communication protocol of a reception side and a transmission side and a payload field 920 that is data to be transmitted. The communication protocol field 910 includes a variety of communication protocol headers 930 through 960 of various layers, such as IPv4 of a network layer, IPv6 or Transmission Control Protocol (TCP) and User Datagram Protocol (UDP) of a transport layer, etc. A variety of communication protocols are provided in an application layer, a presentation layer, a session layer, a data link layer, and a physical layer. The packet may use any combination of layers and protocols.

Communication environment information 970 is designated as a separate protocol for transmitting communication environment information and may be included in the communication protocol field 910, or may be included in a part of the communication protocol headers 930 through 960. Other aspects of the present invention may use any protocol or format to transmit the communication environment information.

Figure 10:
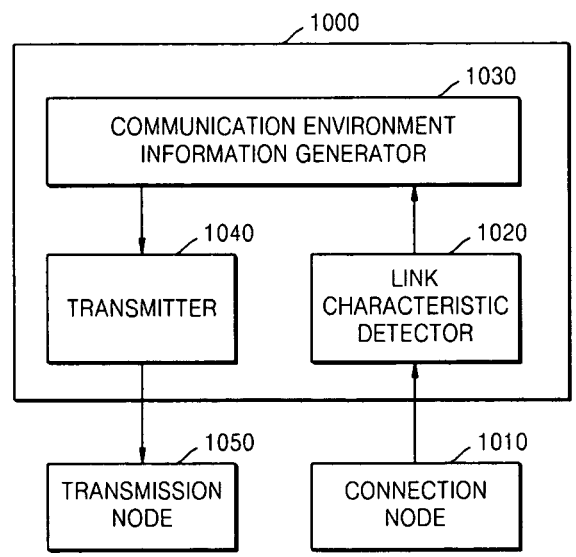
FIG. 10 is a block diagram of a QoS securing apparatus of a reception side according to an embodiment of the present invention.

FIG. 10 is a block diagram of a QoS securing apparatus 1000 of a reception side according to a sixth embodiment of the present invention. Referring to FIG. 10, the QoS securing apparatus 1000 of the reception side comprises a link characteristic detector 1020, a communication environment information generator 1030, and a transmitter 1040.

The link characteristics detector 1020 detects link characteristics from a connection node 1010 accessed by the reception side, i.e., an AP or a router. The detected link characteristics are used to generate link information to be transmitted to a transmission side through the communication environment information generator 1030. The communication environment information generator 1030 generates a field with the communication environment information and inserts the field into a communication protocol field of a data packet or inserts the field into a part of an existing protocol to generate communication environment information.

The transmitter 1040 transmits the communication environment information generated by the communication environment information generator 1030 to a transmission side 1050.

Figure 11:
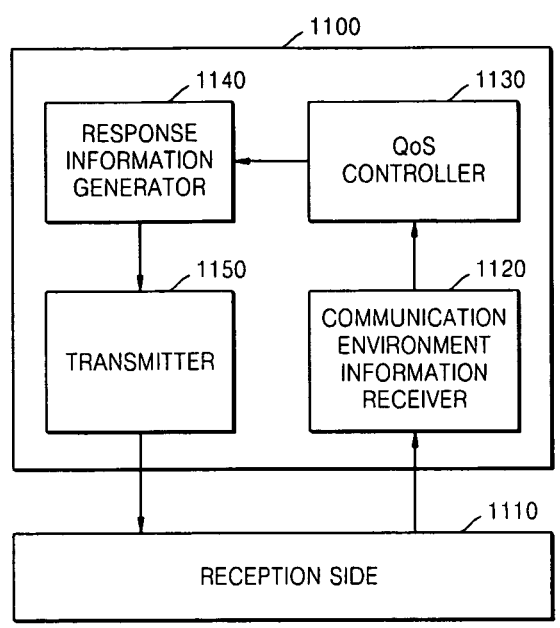
FIG. 11 is a block diagram of a QoS securing apparatus of a transmission side according to an embodiment of the present invention.

FIG. 11 is a block diagram of a QoS securing apparatus 1100 of a transmission side according to a seventh embodiment of the present invention. Referring to FIG. 11, the QoS securing apparatus 1100 of the transmission side comprises a communication environment information receiver 1120, a QoS controller 1130, a response information generator 1140, and a transmitter 1150.

The communication environment information receiver 1120 receives communication environment information transmitted from a reception side 1110, detects link characteristics from the communication environment information, and transmits the link characteristics to the QoS controller 1130.

The QoS controller 1130 determines the size of data to be transmitted to the reception side, a method of encoding the data, a format of the data, or any other QoS factor, in order to prepare transmission of the data according to a changed communication environment of the reception side 1110.

The response information generator 1140 generates a packet including response information indicating the preparation for transmission of the data according to a changed communication environment of the reception side 1110. The response information generator 1140 can generate the response information by setting a specific bit of the data packet transmitted to the reception side 1110 as "0" or "1" and simply indicating whether a transmission side is ready, or by specifically indicating the method of encoding data to be transmitted from the transmission side, the format of the data, the size of the data, and other pertinent information.

The transmitter 1150 transmits the response information generated by the response information generator 1140 to the reception side 1110.

The invention can also be embodied as computer readable instruction codes on a computer readable recording medium. The computer readable recording medium is any data storage device able to store data that can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed network coupled computer systems so that the computer readable code is stored and executed in a distributed fashion.

According to aspects of the present invention, information about a change in characteristics of a link on a transmission path of a reception side or between the reception side and a transmission side is transmitted to the transmission side, and the transmission side transmits data according to changed link characteristics, thereby securing a QoS of data communication between the reception side and the transmission side.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A quality of service (QoS) securing method, comprising:
receiving, by a first apparatus, data transmitted from a second apparatus;
generating, by the first apparatus, a communication environment update request message according to a change in a communication environment of the first apparatus, the first apparatus being in communication with the second apparatus, and the message comprising information about characteristics of a link of the changed communication environment and/or information about useable resources for processing data being received by the first apparatus in the changed communication environment, wherein the information about characteristics of the link of the changed communication environment includes information that is added or corrected on a transmission path from the reception side to the transmission side;
transmitting, by the first apparatus, the communication environment update request message to the second apparatus due to an impending change in network by the first apparatus;
receiving, by the second apparatus, the communication environment update request message from the first apparatus;
updating, by the second apparatus, a QoS of data transmission between the first apparatus and the second apparatus based on the received communication environment update request message;
transmitting, by the second apparatus, response information to the first apparatus, when the second apparatus is ready to transmit data based on the updated QoS;
performing a handover, by the first apparatus, after receipt of the response information from the second apparatus; and
transmitting data from the second apparatus to the first apparatus according to the updated QoS.

2. The method according to claim 1, wherein the information about the link characteristics is information about characteristics of a link of a second network when the first apparatus performs a handover from a first network to the second network.

3. The method according to claim 2, wherein transmitting the message comprises transmitting the information about the characteristics of the link of the second network before the handover is performed.

4. The method according to claim 1, wherein the information about the link characteristics comprises additional information that can be added or corrected on a transmission path from the first apparatus and the second apparatus.

5. The method according to claim 1, further comprising detecting the link characteristics from an access point (AP) or a router of a network to which the first apparatus belongs.

6. The method according to claim 1, wherein the information about the useable resources comprises at least one of a CPU, a video/audio codec, a display resolution, a memory, and the size of a receiving buffer of the first apparatus.

7. The method of claim 1, further comprising:
dividing the communication environment including the first apparatus into a plurality of levels according to a quality of the communication environment; and
allocating a coefficient to each of the plurality of levels,
wherein the transmitting of the information to the transmission side comprises transmitting the allocated coefficients to the transmitting apparatus.

8. The method according to claim 1, wherein the data comprises streaming data.

9. An apparatus comprising:
a communication environment information generator generating information about a changed communication environment of the apparatus, wherein the apparatus is in communication with an external apparatus and has received data from the external apparatus; and
a transceiver transmitting the information about the changed communication environment to the external apparatus, and receiving data from the external apparatus according to a changed quality of service (QoS),
wherein the external apparatus changes a QoS of data transmission based on the information about the changed communication environment received from the apparatus, and
wherein the changed communication environment comprises changes in characteristics of a link detected by analyzing a beacon signal periodically transmitted from an AP or a router of a network to which the apparatus belongs, wherein the information about characteristics of the link of the changed communication environment includes information that is added or corrected on a transmission path from the apparatus to the external apparatus.

10. The apparatus according to claim 9, wherein the information about the changed communication environment further comprises information about useable resources for processing data being received by the apparatus in the changed communication environment.

11. The apparatus according to claim 10, wherein the information about the link characteristics includes information about the characteristics of the link, that is added or corrected on the transmission path, from the apparatus to the external apparatus.

12. The apparatus according to claim 10, further comprising a link characteristics detector detecting the link characteristics from the AP or the router of the network to which the apparatus belongs.

13. The apparatus of claim 9, wherein the communication environment generator divides the communication environment of the apparatus into a plurality of levels according to a status of the communication environment and allocates a coefficient to each of the plurality of levels, and
wherein the apparatus transmits the allocated coefficients to the external apparatus.

14. A quality of service (QoS) securing method comprising:
transmitting data to an apparatus;
receiving information about a changed communication environment of the apparatus from the apparatus, wherein the changed communication environment comprises changes in characteristics of a link detected by analyzing a beacon signal periodically transmitted from an AP or a router of a network to which the apparatus belongs, wherein the information about characteristics of the link of the changed communication environment includes information that is added or corrected on a transmission path from the apparatus;
changing a QoS for data transmission to be transmitted to the apparatus based on the received information; and
transmitting data to the apparatus according to the changed QoS.

15. The method according to claim 14, wherein the information about the communication environment further comprises information about useable resources for processing data to be transmitted to the apparatus in the communication environment of the apparatus.

16. The method according to claim 15, wherein the changing of the QoS comprises changing forward error correction (FEC) of data to be transmitted to the apparatus according to a change in bit error rate (BER) included in the received information about the link characteristics.

17. The method according to claim 15, wherein the changing of the QoS comprises changing at least one of the number of frames per second, resolution, and compressibility of the data to be transmitted to the apparatus according to a change in a data transmission speed included in the received information about the link characteristics.

18. The method according to claim 14, further comprising:
generating response information indicating that the QoS for the data transmission has been changed based upon the received information about the communication environment of the apparatus; and
transmitting the generated response information to the apparatus.

19. A quality of service (QoS) securing apparatus comprising:
a transmitter transmitting data to a device;
a communication environment information receiver receiving information about a changed communication environment of the device, wherein the changed communication environment comprises changes in characteristics of a link detected by analyzing a beacon signal periodically transmitted from an AP or a router of a network to which the device belongs and wherein the information receiver receives the information about the changed communication environment after the transmitter has transmitted data to the device, wherein the information about characteristics of the link of the changed communication environment includes information that is added or corrected on a transmission path from the device; and
a QoS controller, configured to change a QoS for data transmission based upon the received information about the communication environment of the device,
wherein the QoS securing apparatus transmits data to the device according to the changed QoS.

20. The apparatus according to claim 19, wherein the information about the communication environment further comprises information about useable resources for processing data being received by the device in the communication environment of the device.

21. The apparatus according to claim 20, further comprising:
a response information generator generating response information indicating that the QoS for the data transmission has been changed based upon the information about the communication environment,
wherein the apparatus transmits the response information to the device.

22. The apparatus according to claim 19, wherein the QoS controller changes forward error correction (FEC) of data to be transmitted to the device according to a change in bit error rate (BER) included in the received information about the link characteristics.

23. The apparatus according to claim 19, wherein the QoS controller changes at least one of a number of frames per second, resolution, and compressibility of the data to be transmitted to the device based upon a change in a data transmission speed included in the information about the link characteristics.

24. A non-transitory computer readable recording medium encoded with computer executable instructions comprising:
receiving, by a first apparatus, data transmitted from a second apparatus;
generating, by the first apparatus, a communication environment update request message according to a change in a communication environment of the first apparatus, the first apparatus being in communication with the second apparatus, and the message comprising information about characteristics of a link of the changed communication environment and/or information about useable resources for processing data being received by the first apparatus in the changed communication environment, wherein the information about characteristics of the link of the changed communication environment includes information that is added or corrected on a transmission path from the first apparatus to the second apparatus;
transmitting, by the first apparatus, the communication environment update request message to the second apparatus due to an impending change in network by the first apparatus;
receiving, by the second apparatus, the communication environment update request message from the first apparatus;
transmitting, by the second apparatus, response information to the first apparatus after receiving the communication environment update request message;
updating, by the second apparatus, a quality of service (QoS) of data transmission between the first apparatus and the second apparatus based on the received communication environment update request message;
performing a handover, by the first apparatus, after receipt of the response information from the second apparatus; and
transmitting data from the second apparatus to the first apparatus according to the updated QoS.

25. A non-transitory computer readable recording medium encoded with computer executable instructions comprising:
transmitting data to an apparatus;
receiving information about a changed communication environment of the apparatus from the apparatus, wherein the changed communication environment comprises changes in characteristics of a link detected by analyzing a beacon signal periodically transmitted from an AP or a router of a network to which the apparatus belongs, wherein the information about characteristics of the link of the changed communication environment includes information that is added or corrected on a transmission path from the apparatus;
changing a quality of service (QoS) for data transmission to be transmitted to the apparatus based on the received information; and
transmitting data to the apparatus according to the changed QoS.

26. A method of securing a quality of service (QoS), comprising:
receiving, by a first apparatus, data transmitted from a second apparatus;
generating, by the first apparatus, information about a changed communication environment of the first apparatus, wherein the changed communication environment comprises changes in characteristics of a link detected by analyzing a beacon signal periodically transmitted from an AP or a router of a network to which the first apparatus belongs, wherein the information about characteristics of the link of the changed communication environment includes information that is added or corrected on a transmission path from the first apparatus to the second apparatus;
adding or correcting, by the first apparatus, the information based on characteristics of the changes in the link;
transmitting the added or corrected information from the first apparatus to the second apparatus; and
receiving, by the first apparatus, data from the second apparatus according to a QoS for transmission of the data between the first apparatus and the second apparatus, the QoS being changed based on the transmitted added or corrected information.

27. A quality of service (QoS) securing apparatus comprising:
a transmitter to transmit data to a network device;
a transceiver to receive added or corrected information about a changed communication environment of the network device from the device, wherein the information can be added or corrected by a modifier of the device based on changes in characteristics of a link detected by analyzing a beacon signal periodically transmitted from an AP or a router of a network to which the device belongs and wherein the transreceiver receives the corrected information about the changed communication environment after the transmitter has transmitted data to the network device, wherein the information about characteristics of the link of the changed communication environment includes information that is added or corrected on a transmission path from the apparatus to the network device; and
a QoS modifier configured to modify
a QoS for transmission of the data to be transmitted from the apparatus to the device based on the added or corrected information received from the device and transmit data to the device according to the modified QoS.

28. The apparatus according to claim 27, wherein the apparatus is a router.

29. A router situated on a transmission path between a first network device and a second network device to receive information about a changed communication environment transmitted from the first device, the router comprising:
a transmitter to transmit data to the first device from the second device;

a transceiver to receive the information about the changed communication environment of the first device from the first device, wherein the changed communication environment comprises changes in characteristics of a link detected by analyzing a beacon signal periodically transmitted from an AP or a router of a network to which the first device belongs and wherein the transreceiver receives the information about the changed communication environment after the transmitter has transmitted data to first device, wherein the information about characteristics of the link of the changed communication environment includes information that is added or corrected on a transmission path from the first device to the second device; and an updater to add or correct the information about the changed communication environment of the first device based on the characteristics of the link, wherein the transceiver transmits the added or corrected information to the second device, and wherein the second device changes a quality of service (QoS) for transmission of data based on the added or corrected information received from the router and transmits the data to the first device according to the changed QoS.

30. A non-transitory computer readable recordable medium encoded with computer executable instructions, the instructions comprising:

transmitting data to an apparatus;

receiving information about a changed communication environment of a first device from the first device, wherein the changed communication environment comprises changes in characteristics of a link detected by analyzing a beacon signal periodically transmitted from an AP or a router of a network to which the first device belongs, wherein the information about characteristics of the link of the changed communication environment includes information that is added or corrected on a transmission path from the first device;

adding or correcting the information about the changed communication environment of the first device based on the characteristics of the link; and transmitting the added or corrected information to the second device, wherein the second device changes a quality of service (QoS) for transmission of data based on the added or corrected information and transmits the data to the first device according to the changed QoS.

* * * * *